United States Patent
Ranjan

(10) Patent No.: US 8,311,820 B2
(45) Date of Patent: Nov. 13, 2012

(54) SPEECH RECOGNITION BASED ON NOISE LEVEL

(75) Inventor: Amit Ranjan, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 266 days.

(21) Appl. No.: 12/754,611

(22) Filed: Apr. 6, 2010

(65) Prior Publication Data

US 2011/0184724 A1    Jul. 28, 2011

(30) Foreign Application Priority Data

Jan. 28, 2010   (IN) .............................. 220/CHE/2010

(51) Int. Cl.
*G10L 15/20*  (2006.01)
*G10L 15/00*  (2006.01)
*G10L 15/04*  (2006.01)

(52) U.S. Cl. .................... 704/233; 704/231; 704/251
(58) Field of Classification Search .................. 704/231, 704/251, 254, 255, 233
See application file for complete search history.

(56) References Cited

U.S. PATENT DOCUMENTS

| | | | | |
|---|---|---|---|---|
| 4,239,936 A | * | 12/1980 | Sakoe | 704/233 |
| 5,794,194 A | * | 8/1998 | Takebayashi et al. | 704/251 |
| 5,850,627 A | * | 12/1998 | Gould et al. | 704/231 |
| 6,577,997 B1 | * | 6/2003 | Gong | 704/252 |
| 6,735,562 B1 | * | 5/2004 | Zhang et al. | 704/240 |
| 6,868,162 B1 | * | 3/2005 | Jubien et al. | 381/107 |
| 7,149,694 B1 | * | 12/2006 | Harb et al. | 704/270.1 |
| 7,165,031 B2 | * | 1/2007 | Rees | 704/252 |
| 2004/0199388 A1 | * | 10/2004 | Armbruster et al. | 704/251 |
| 2006/0085183 A1 | * | 4/2006 | Jain | 704/233 |

* cited by examiner

*Primary Examiner* — Jesse Pullias

(57) ABSTRACT

Presented is a method and system for speech recognition. The method includes determining a noise level in an environment, comparing the determined noise level with a predetermined noise level threshold value, using a first set of grammar for speech recognition, if the determined noise level is below the predetermined noise level threshold value, and using a second set of grammar for speech recognition, if the determined noise level is above the predetermined noise level threshold value.

19 Claims, 2 Drawing Sheets

SPEECH RECOGNITION BASED ON NOISE LEVEL

RELATED APPLICATIONS

Benefit is claimed under 35 U.S.C. 119(a)-(d) to Foreign application Serial No. 220/CHE/2010 entitled "SPEECH RECOGNITION" by Hewlett-Packard Development Company, L.P., filed on Jan. 28, 2010, which is herein incorporated in its entirety by reference for all purposes

BACKGROUND

Speech is a natural form of human expression. Irrespective of age, whether it's a small child or a grown up individual, speech comes naturally to humans and is "the" mode of human interaction. Realizing this preferred mode of human interaction, computer scientists have extended this natural form of human interaction to computing systems, and over the years speech recognition systems have evolved considerably in recognizing human speech. Therefore, whether it's a simple command application or a dictation system, speech recognition systems have become quite useful in human-computer interaction. However, one problem with any speech system is spurious speech recognition, especially in a noisy environment, such as, traffic or a factory establishment. Spurious or background noise severely impacts the ideal use of a speech recognition system and creates difficulties during interaction. This affects the system's reliability since the speech recognition system is unable to distinguish between a speech input and a spurious input.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
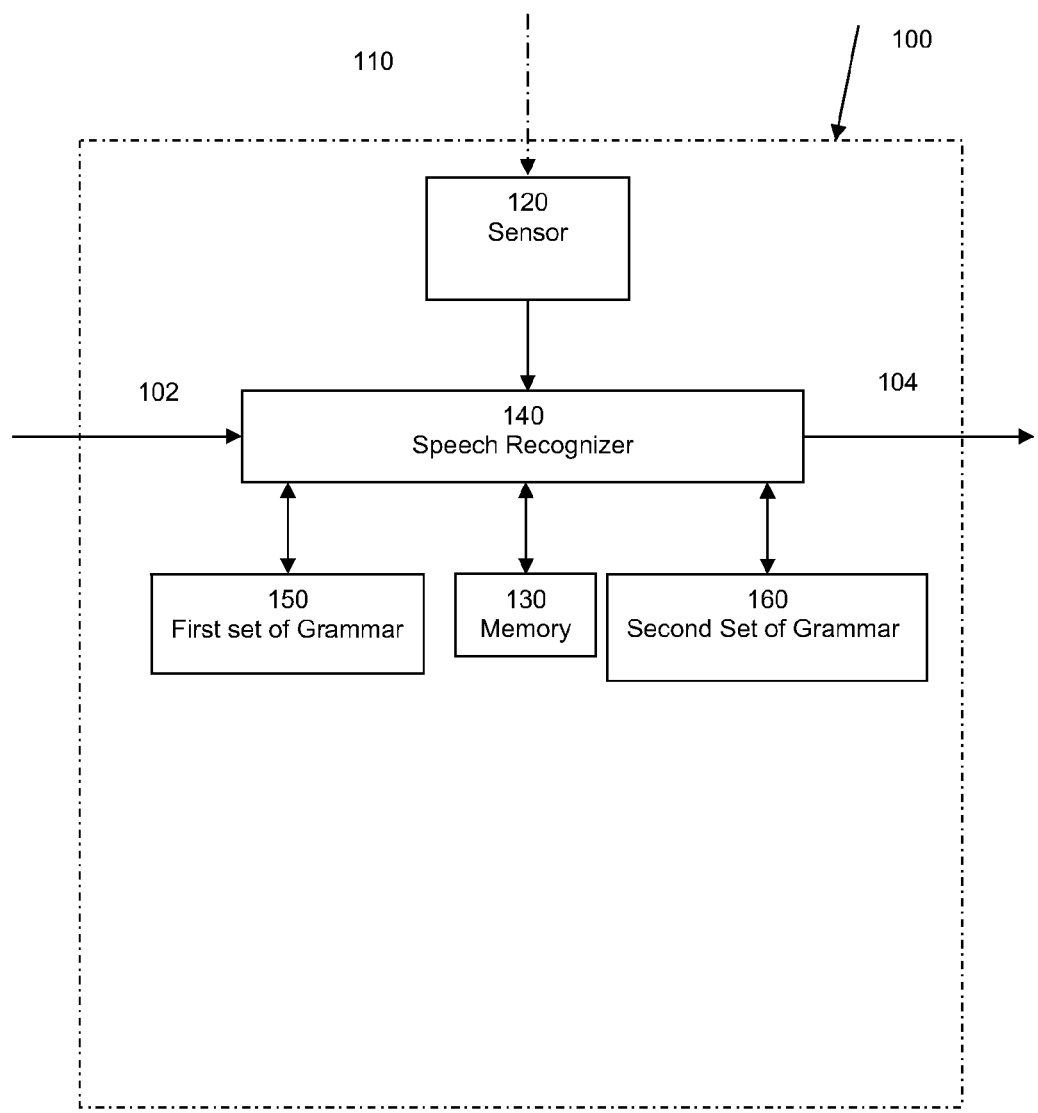
FIG. 1 shows a speech recognition system according to an embodiment of the invention.

Referring to FIG. 1, there is illustrated a speech recognition system 100 according to an embodiment of the invention.

The speech recognition system 100 comprises a sensor 120, a memory module 130, a speech recognizer 140, a first set of grammar for speech recognition 150, a second set of grammar for speech recognition 160 and a display unit (not shown). The speech recognition system 100 operates in an environment 110 and may be implemented in a large number of devices, such as, but not limited to, a personal computer system, a hand held device, a mobile phone, a laptop, a notebook computer, a network computer, a personal digital assistant (PDA) etc. The speech recognition system 100 may be integrated into any of the aforementioned devices or it may also be a standalone individual unit.

Sensor 120 is a device which receives and responds to a stimulus. In the present embodiment, sensor gathers and calculates the ambient noise from the environment 110 around the speech recognition system 100 converts it into electrical signal. The electrical signal is passed on to the speech recognizer 140. In the present embodiment, the sensor 120 is integrated with the speech recognition system 100. However, in other embodiments, the sensor may be an independent unit which is operably attachable to the speech recognition system 100.

Memory module 130 is used to store a predefined noise level threshold value. A user of the speech recognition system 100 has the option to define a predefined noise level threshold value in advance of the usage or in real time. A user interface (not shown) is used to input the predetermined noise level threshold value.

The predefined noise level threshold value may vary according to the operating environment conditions 110 in which the speech recognition system 100 is used. In the present embodiment, the memory module is integrated with the speech recognition system. However, in other embodiments, the memory module may be an distinct unit which is operably attachable to the speech recognition system 100.

The memory module 130 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc.

Speech recognizer 140 is a processing device (processor) or a computer application that recognizes human speech or spoken instructions. It is generally used to convert spoken words to text, and is used in a number of applications and devices to perform a variety of tasks. Some speech recognition applications or devices include speech-to-text processing, voice dialing, data entry, medical appliances, aircraft control applications, robotics, etc. In the present embodiment, speech recognizer 140 recognizes a speech input 102 and provides an output 104. The output 104 may be another speech, a text on a display device, a graphic representation, etc.

Speech recognizer 140 may use a grammar set to recognize speech. For example, a Chinese speech recognizer may use a Chinese grammar application, which stores Chinese words, phrases, grammar rules, etc. to understand Chinese speech. In the present embodiment, speech recognizer 140 comprises at least two sets of grammar: a first set of grammar for speech recognition 150 and a second set of grammar for speech recognition 160. The second set of grammar for speech recognition 160 is more restrictive than the first set of grammar for speech recognition 150. In other words, the second set of grammar for speech recognition 160 may contain fewer words than the first set of grammar for speech recognition 150. The first set of grammar for speech recognition 150 and the second set of grammar for speech recognition 160 may be stored in the memory module 130 or a separate storage unit, such as, but not limited to, another memory module or a database, in the speech recognition system 100.

A user interface (not shown) may be used to define the first set of grammar for speech recognition 150 and the second set of grammar for speech recognition 160.

In the present embodiment, speech recognizer 140 is configured to compare the noise level (determined by the sensor 120) with the predetermined noise level threshold value stored in the memory module 130. It is further configured to use the first set of grammar 150 for speech recognition, if the determined noise level is below the predetermined noise level threshold value, and to use the second set of grammar for speech recognition 160, if the determined noise level is above the predetermined noise level threshold value.

It would be appreciated that the components depicted in FIG. 1 are for the purpose of illustration only and the actual components (including their number) may vary depending on the computing system or device deployed for implementation of the present invention.

Figure 2:
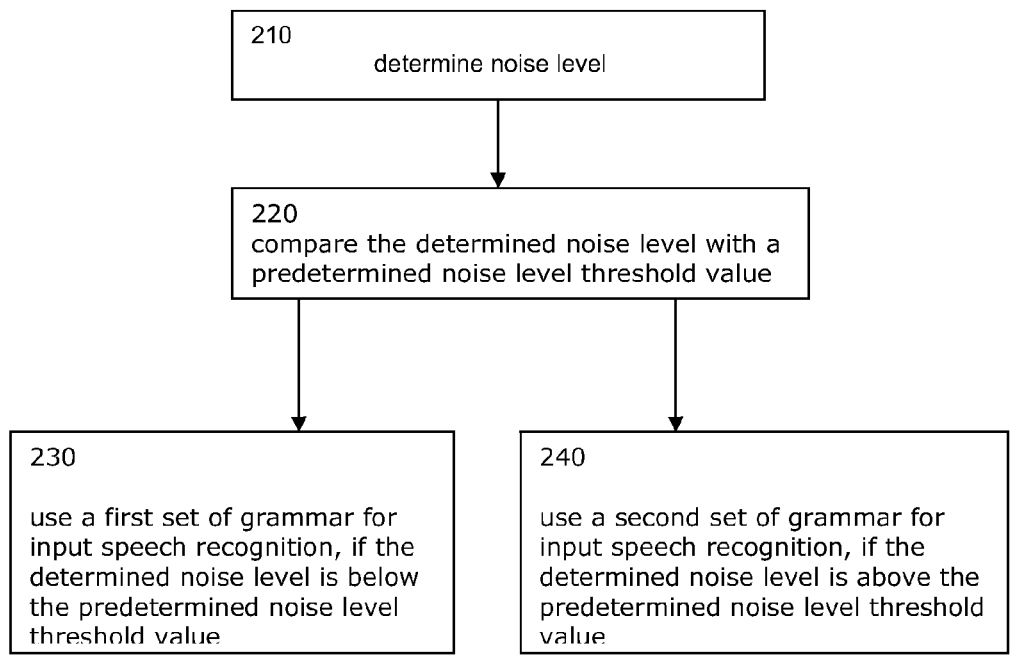
FIG. 2 shows a flow chart of a method of speech recognition according to an embodiment of the invention.

FIG. 2 shows a flow chart of a method 200 of speech recognition according to an embodiment of the invention.

A noise level threshold value may be determined beforehand prior to implementing the method. The noise level threshold value may vary according to operating environment conditions. For example, in a quiet environment, such as a research lab or a lecture room, the noise level threshold value may be low. On the other hand, in a noisy environment, such as a factory or a highway, the noise level threshold value may be high.

Step 210 of the method 200 includes determining noise level of the ambient environment. A sensor may be used to determine the ambient noise level at periodic intervals.

Step 220 involves comparing the determined noise level with a predetermined noise level threshold value. As mentioned above, a noise level threshold value is predetermined or decided in advance depending on the operating environment conditions. Upon comparison, if the determined noise level is below the predetermined noise level threshold value, a first set of grammar is used for speech recognition (step 230). On the other hand, if the determined noise level is above the predetermined noise level threshold value, a second set of grammar is used for speech recognition (step 240).

In the present embodiment, the second set of grammar is more restrictive than the first set of grammar. In other words, the second set of grammar for speech recognition may contain limited words in comparison to the first set of grammar for speech recognition. To provide an illustration, by way of a non-limiting example, the first set of grammar may contain and allow multiple words (such as okay, OK, all right, sure, etc.) to recognize a "Yes" input to a system. On the other hand, the second set of grammar, which is restrictive, may allow only the "Yes" input to recognize an input speech command. Therefore, in the present context, if the determined noise level is below a predetermined noise level threshold value (i.e. in quiet environments), a first set of grammar would be used for speech recognition. In the alternative, if the determined noise level is above the predetermined noise level threshold value (i.e. in noisy environments), the second more restrictive set of grammar would be used for speech recognition. It may be mentioned that the first set of grammar may be more akin to natural human language than the second set of grammar.

Although only two sets of grammar have been employed in the present embodiment, it would be appreciated that multiple sets of grammar may also be used.

In another embodiment, the second set of grammar may require usage of an attention word prefix. To illustrate, let's take a scenario when two persons are sitting in private. If one of them speaks then there is no ambiguity for the second person. Since the environment is relatively quite the second person would know that he is the one who is spoken to and what is being said. In another scenario, if the same two persons are present in a noisy environment, then the earlier assumption doesn't hold true. The second person has no way of knowing if the first person is speaking to him or someone else. They may solve this problem by simply calling out the name to get the attention of the other person. After hearing the attention word prefix, "name of the person", the next person can be sure that he is the one being spoken to. In the context of a computing environment, the alternate embodiment uses the same approach. If the speech grammar is "launch photo application" then in an environment where the noise is below a predetermined threshold value, this grammar would be used. If the noise level crosses the threshold value, then user may be required to use a second set of grammar, say, "computer launch photo application" which requires using an attention word prefix, "computer".

It would be appreciated that the embodiments described above would bring down the error rate of speech recognition, by voice input, in a noisy environment. The proposed solution improves the reliability of speech input in a noisy environment, provides a more natural form of user interaction, which adapts itself to change in environmental factors.

It would be further appreciated that the embodiments within the scope of the present invention may be implemented in the form of a computer program product or means including computer-executable instructions, such as program code, which may be adapted to perform all or any of the above described method steps and run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A method of speech recognition, the method comprising:
   determining a noise level in an environment;
   comparing, by a processor, the determined noise level with a predetermined noise level threshold value;
   using a first set of grammar for speech recognition if the determined noise level is below the predetermined noise level threshold value; and
   using a second set of grammar for speech recognition if the determined noise level is above the predetermined noise level threshold value.

2. A method according to claim 1, wherein the second set of grammar is more restrictive than the first set of grammar.

3. A method according to claim 1, wherein the second set of grammar requires usage of an attention word prefix.

4. A method according to claim 1, wherein the predetermined noise level threshold value is based on operating environment conditions.

5. A method according to claim 1, wherein the noise level in the environment is determined using a sensor.

6. A method according to claim 1, wherein the noise level is determined at periodic intervals.

7. A system for speech recognition, the system comprising:
   a sensor to determine a noise level in an environment;
   a memory to store a predetermined noise level threshold value;
   a speech recognizer to compare the determined noise level with the predetermined noise level threshold value, to use a first set of grammar for speech recognition if the determined noise level is below the predetermined noise level threshold value, and to use a second set of grammar for speech recognition if the determined noise level is above the predetermined noise level threshold value.

8. A system according to claim 7, wherein the second set of grammar is more restrictive than the first set of grammar.

9. A system according to claim 7, wherein the sensor is an independent unit.

10. A system according to claim 7, wherein the memory is a distinct unit.

11. A system according to claim 7, further comprising a user interface to input the predetermined noise level threshold value.

12. A system according to claim 7, further comprising a user interface to define the first set of grammar for speech recognition and the second set of grammar for speech recognition.

13. A computer system comprising the speech recognition system of claim 7.

14. A non-transitory computer readable medium storing machine readable instructions, which when executed by a processor cause a device to:

determine a noise level in an environment;

compare the determined noise level with a predetermined noise level threshold value;

use a first set of grammar for speech recognition if the determined noise level is below the predetermined noise level threshold value; and use a second set of grammar for speech recognition if the determined noise level is above the predetermined noise level threshold value.

15. The non-transitory computer readable medium according to claim 14, wherein the second set of grammar is more restrictive than the first set of grammar.

16. The non-transitory computer readable medium according to claim 14, wherein the second set of grammar requires usage of an attention word prefix.

17. The non-transitory computer readable medium according to claim 14, wherein the predetermined noise level threshold value is based on operating environment conditions.

18. The non-transitory computer readable medium according to claim 14, wherein the noise level in the environment is determined using a sensor.

19. The non-transitory computer readable medium according to claim 14, wherein the noise level is determined at periodic intervals.

* * * * *